Figures 1, 15, 16:
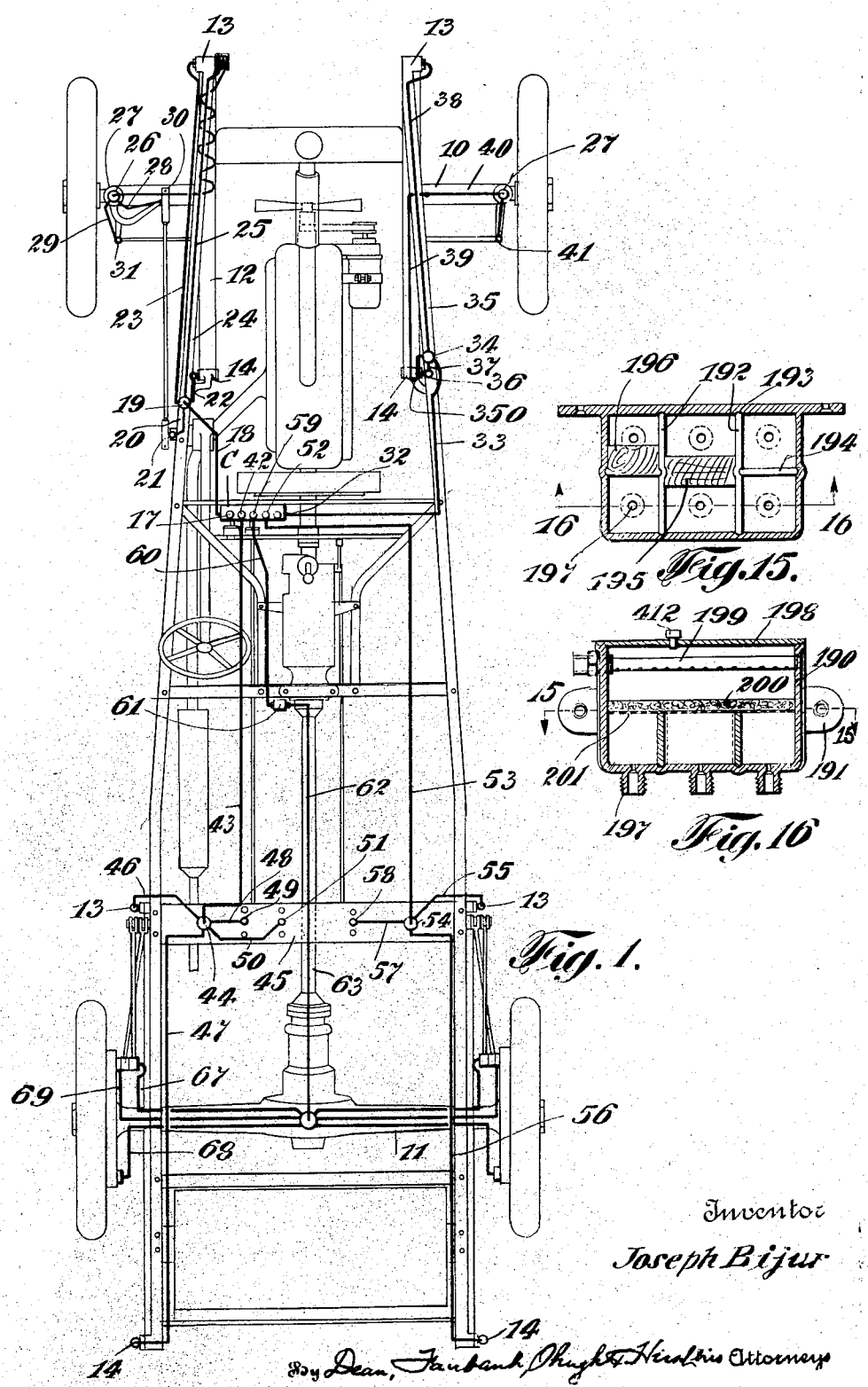

Dec. 26, 1933.  J. BIJUR  1,940,784
LUBRICATION METHOD AND INSTALLATION AND THE ELEMENT THEREOF
Filed Dec. 2, 1922   5 Sheets-Sheet 1

Inventor
Joseph Bijur

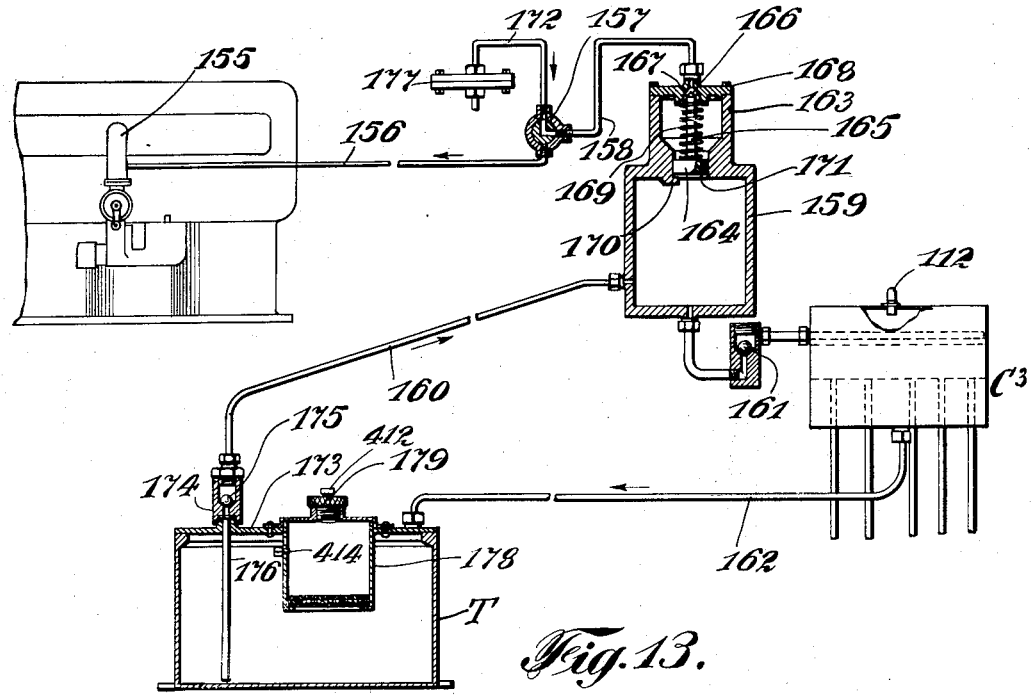
Fig. 13.
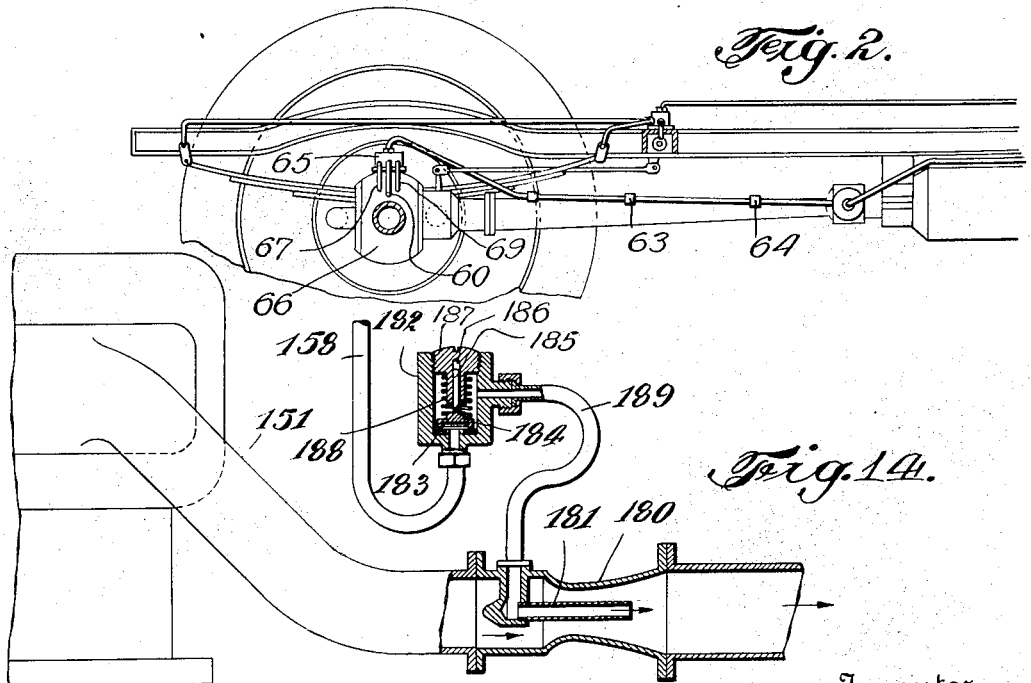
Fig. 2.
Fig. 14.
Inventor
Joseph Bijur
By his Attorneys Dec. 26, 1933.   J. BIJUR   1,940,784
LUBRICATION METHOD AND INSTALLATION AND THE ELEMENT THEREOF
Filed Dec. 2, 1922   5 Sheets-Sheet 3
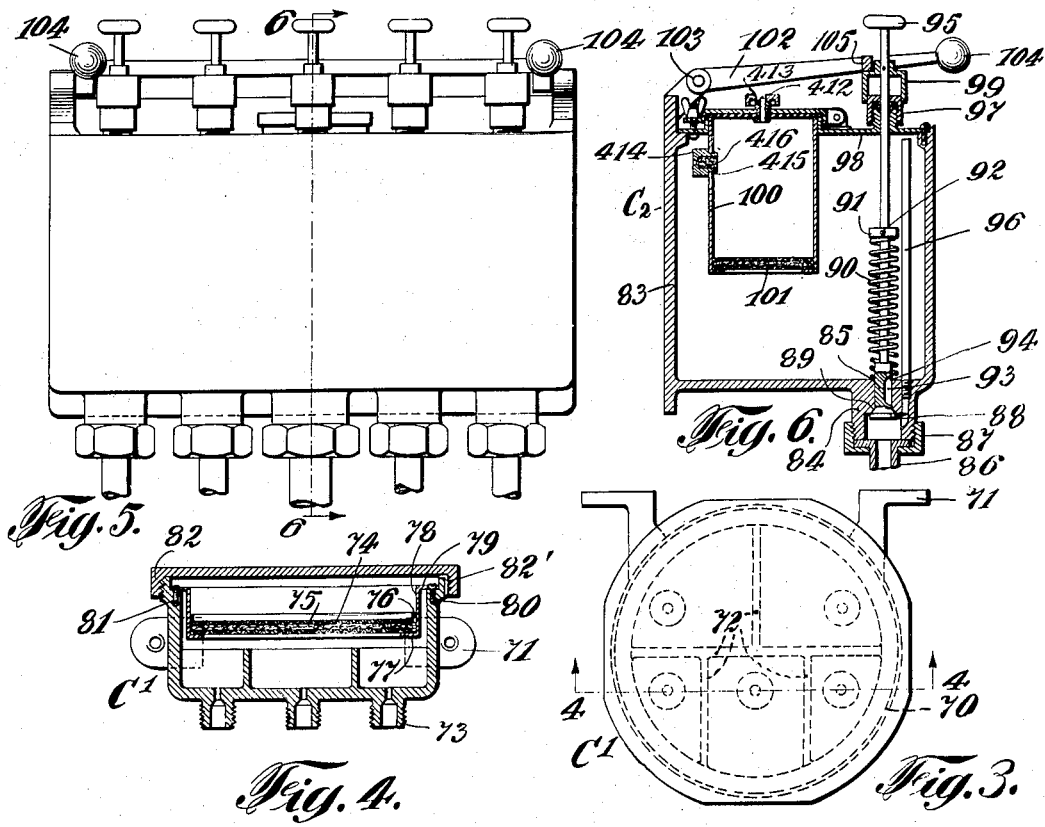

Dec. 26, 1933.    J. BIJUR    1,940,784
LUBRICATION METHOD AND INSTALLATION AND THE ELEMENT THEREOF
Filed Dec. 2, 1922    5 Sheets-Sheet 4

Inventor
Joseph Bijur
By Dear, Fairbank, Obright & Hirsch
his Attorneys

Dec. 26, 1933.  J. BIJUR  1,940,784
LUBRICATION METHOD AND INSTALLATION AND THE ELEMENT THEREOF
Filed Dec. 2, 1922   5 Sheets-Sheet 5

Inventor
Joseph Bijur
By Dean, Fairbank,
Creighton & Hirsch
his Attorneys

Patented Dec. 26, 1933

1,940,784

UNITED STATES PATENT OFFICE 1,940,784

LUBRICATION METHOD AND INSTALLATION AND THE ELEMENT THEREOF

Joseph Bijur, New York, N. Y., assignor, by mesne assignments, to Auto Research Corporation, a corporation of Delaware Application December 2, 1922. Serial No. 604,464

53 Claims. (Cl. 184—7)

My present invention relates to lubricating installations and more particularly to oil lubrication of some or all of the bearings of the chassis of a motor vehicle.

An object of the invention is to provide for a machine or system of machines and more particularly for a motor vehicle chassis, a simple and reliable installation, devoid of sensitive or delicate parts and operable substantially without effort for satisfactorily lubricating all or a substantial number of the bearings thereof, without the need for inspection of or manual access to said bearings.

Among other objects of the invention are, to provide an installation of the above type by which the lubrication is effected by operation at one or more conveniently accessible control stations, without the use of pressure pumps or outlet valves for the ends of the oil lines, or the need for pressure-tight lines, and in which the oil will pass reliably to the bearings without clogging, even after prolonged use.

Another object is to provide a lubricating installation, the use of which shall not require the exercise of any selective discretion, but in which, as the result of a simple manipulation, correct and sufficient lubrication is effected at each of the bearings, whether tight or loose and without excessive overflow.

My lubricating installation includes, a central control or charging station, filled by a single operation and associated with means to automatically subdivide the charge to feed to each of various bearings, a predetermined quantity of oil by drainage, preferably through lines open at their ends. The charging station may supply measured charges to sub-stations at various parts of the vehicle, each of the sub-stations supplying measured quantities to a plurality of bearings connected thereto. The drainage may be effected by gravity head between the charging station or the substations and the bearings, the feed to the bearing or bearings at the highest elevation being effected by the aid of a wick or wicks, if desired, or required.

The central or charging station may be a simple hand-filled compartment receptacle provided with a cover which may be shifted for filling and then restored to closed position. In another embodiment, the charging station is associated with a main reservoir of oil, the separate compartments being normally in communication with said reservoir and being discharged by a manual operation. In another embodiment, the charging station comprises a substantially closed receptacle having a plurality of compartments in the interior thereof, each draining to one of the substations or direct to bearings, special means being provided to transport lubricant from a central reservoir to the charging station to completely fill the compartments therein, an overflow passage being provided to return to the main reservoir, the excess lubricant beyond that required to fill the compartments. My invention contemplates various alternative means for conveying lubricant from the main reservoir to the measuring compartments in the embodiment last referred to, among which are elevation by a hand-pump or by the use of the engine oil pump or through suction or pressure from the engine.

The sub-stations are preferably substantially sealed but suitably vented compartment boxes with which the draining conduits communicate, said boxes having compartments, one connected to each of the bearings, an oil spreading pad over the compartments, intercepting the oil admitted to the sub-station, to assure correct distribution thereof to the compartments therein.

The passage of the lubricant charge through the line may be facilitated by the application of pneumatic or gas pressure, either from the engine exhaust or from a special air or gas bottle, more particularly, where the oil is viscous as in cold weather, or where pipe lines of extraordinarily small bore are used. The pneumatic agent may be used as a substitute for the gravity head, and the charging station may accordingly be at an elevation lower than all or many of the bearings.

It is preferred to provide means for preventing the application of pneumatic pressure directly to the bearings, and to this end the pneumatic pressure is vented in advance of the bearings, the lubricant being intercepted for drainage to the bearings, substantially free from pneumatic pressure.

The above and other features of my invention may be more fully understood from the accompanying drawings in which are shown various possible embodiments of the several features of the invention.

In the figures:—

Figure 9:
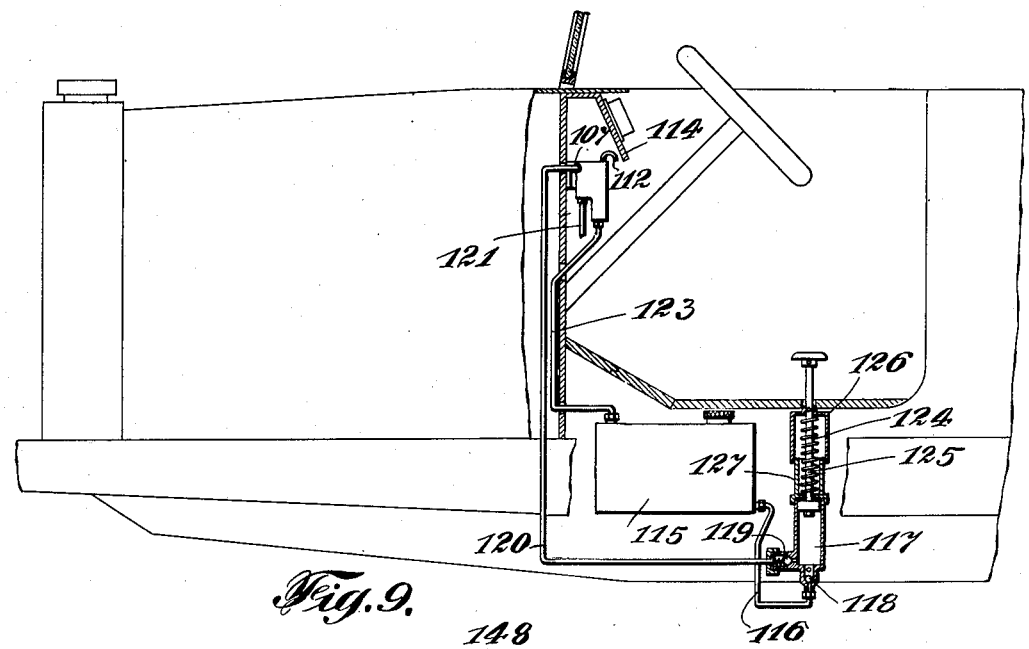
Figures 7, 8, 12:
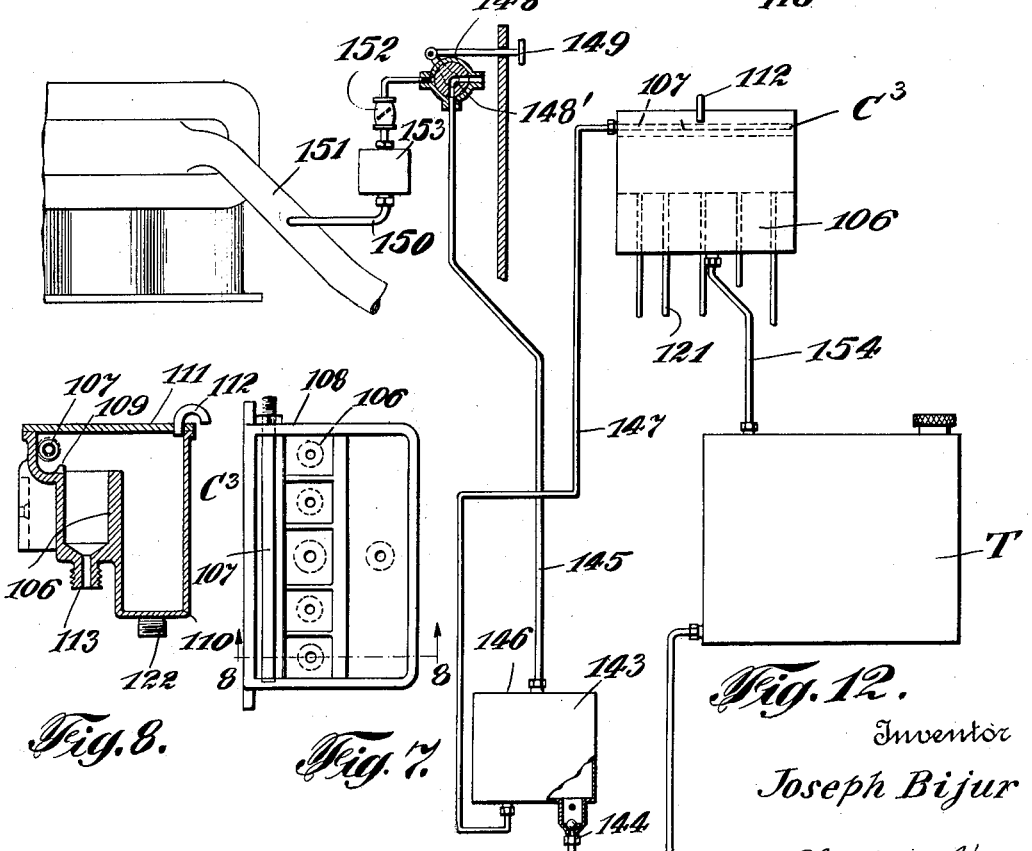
Figure 20:
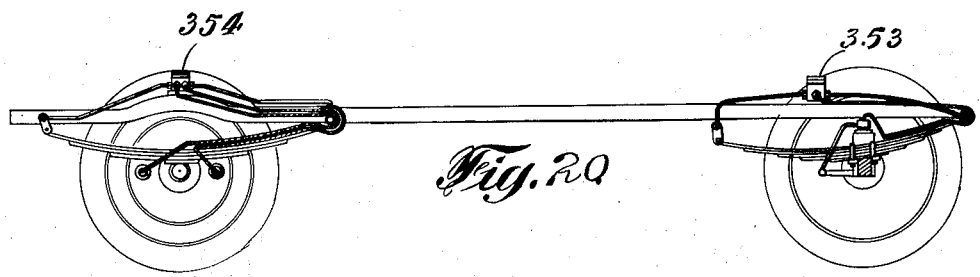
Figure 21:
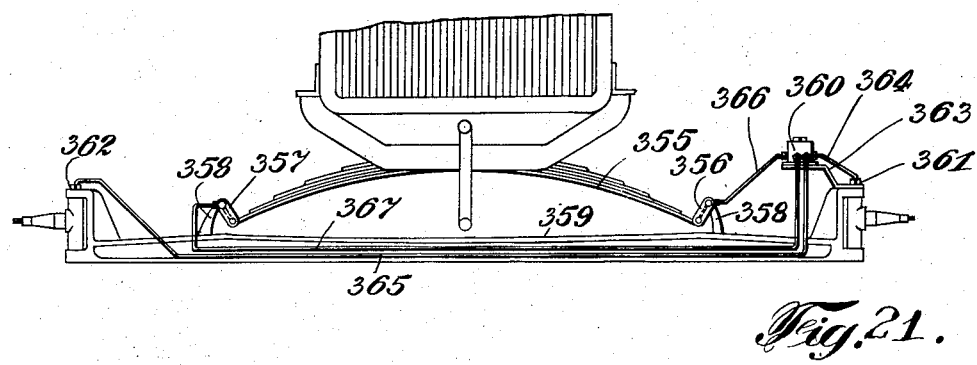
Figure 10:
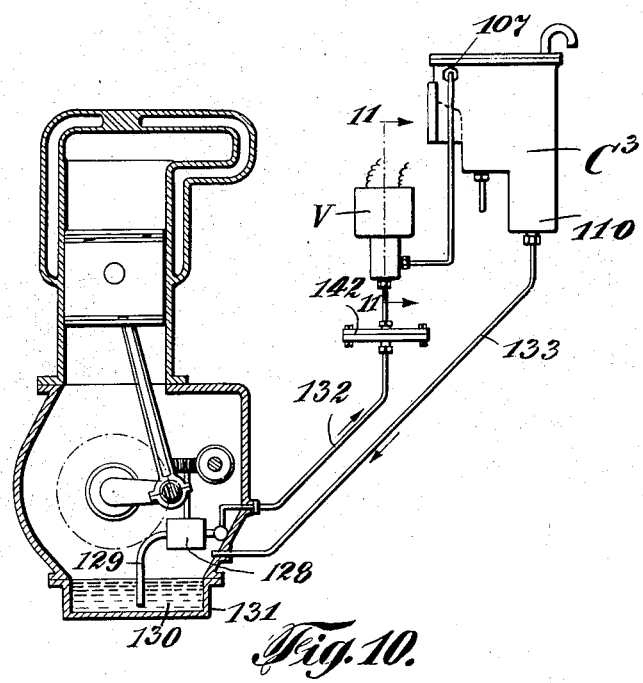
Figure 11:
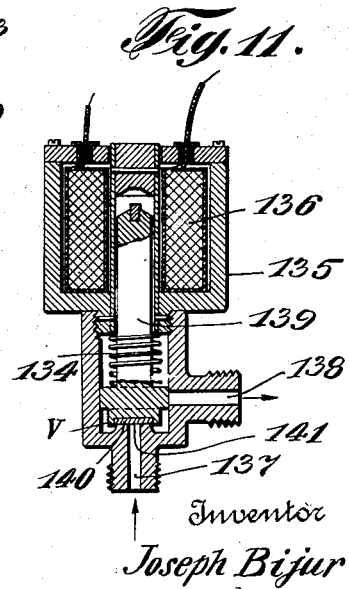

Fig. 1 is a plan view of a chassis, indicating diagrammatically a complete installation, Fig. 2 is a side elevation of the rear portion of the chassis of Fig. 1, Fig. 3 is a plan view of one form of charging station, Fig. 4 is a transverse sectional view taken along the line 4—4 of Fig. 3, Fig. 5 is a front elevation of an alternative form of combined reservoir and charging station, Fig. 6 is a transverse sectional view taken along the line 6—6 of Fig. 5, Fig. 7 is a plan view, with cover removed, of another form of charging station, Fig. 8 is a sectional view taken along the line 8—8 of Fig. 7, Fig. 9 is a side elevation, parts broken away and parts indicated in section, of a portion of a motor vehicle showing one arrangement for charging the station of Figs. 7 and 8, Fig. 10 is a diagrammatic view of alternative means for charging a station of the type shown in Figs. 7 and 8, Fig. 11 is a sectional view taken along the line 11—11 of Fig. 10 showing a magnetic control valve for the embodiment of Fig. 10, on a larger scale, Fig. 12 is a diagrammatic view of an alternative arrangement for filling a charging station of the character of that of Figs. 7 and 8, Figs. 13 and 14 are diagrammatic views of charging arrangements alternative to that of Fig. 12, Fig. 15 is a view in horizontal cross-section of one form of distributing box, taken along the line 15—15 of Fig. 16, Fig. 16 is a sectional view taken along the line 16—16 of Fig. 15, Fig. 17 is a side elevation illustrating diagrammatically an alternative form of lubricating installation, Fig. 18 is an elevation on an enlarged scale of a flexible conduit arrangement from the chassis frame to the axle, Fig. 19 is a sectional view taken along the line 19—19 of Fig. 18, Fig. 20 is a view similar to Fig. 17 of an alternative installation, Fig. 21 is a front elevation of another lubricating installation.

General layout—Fig. 1

The diagrammatic layout of Fig. 1 shows the chassis of a conventional automobile including the chassis frame having a front axle 10 and rear axle 11, springs 12 connecting said axles to said chassis frame, each spring being connected at its front end to the chassis by means of a bolt 13 and at the rear end by a spring shackle link 14 in the well understood manner. Disposed in any suitable place on the vehicle and to be more fully set forth in the description of various embodiments below, is a central filling, charging or supply station, diagrammatically indicated at C from which definite charges of lubricant are supplied, as desired, to the various bearings. Various alternative forms of the central charging or supply station are described below and are shown in Figs. 3 and 4, 5 and 6, and 7 and 8, each, moreover, identified by letters C¹, C², and C³. A characteristic of all embodiments of the charging stations is that they include separate measuring compartments, (five being indicated diagrammatically in Fig. 1) connected by conduits to supply substations, or distributing boxes, at the latter of which the oil is automatically subdivided for passage to bearings supplied therefrom, although some or all of the bearings may be supplied direct from the charging station.

As indicated in Fig. 1, the first compartment 17 is connected by a conduit 18 to a compartment distributing box 19 shown in detail in Figs. 15 and 16 from which one conduit 20 supplies the steering gear 21, and a second conduit 22 supplies the contiguous spring shackle 14. A third conduit 23 extending lengthwise of the channel frame 24 is connected to the forward or outer end of the spring bolt 13 by any suitable fitting (not shown) and a fourth conduit 25 extends toward the front of the chassis to supply a sub-distributing box 26 at the king pin 27 from which the oil is supplied through conduits 28 and 29 respectively to the contiguous steering and tie rod arm bearings 30 and 31.

The distributing box 19 may have four compartments to supply different quantities of oil, the largest of which compartments leads to conduit 25, which supplies the sub-distributing means 26 supplying the various knuckle and king pin bearings. The distributing means 26 preferably proportions the lubricant in the desired amounts to the upper and lower king pin bearings and also if desired to the drag link and tie rod bearings.

The lubricating apparatus will be identical at both sides of the vehicle, but I have shown a modified embodiment at the right forward end of the vehicle, supplied from the last compartment 32 of the charging station. In this case, a conduit 33 extends to a sub-station 34 generally similar to that at 19 and upon the right channel frame 35. Sub-station 34 supplies spring shackle 36 through conduit 37 and front spring bolt 13 through conduit 38. A third, preferably, a flexible conduit 39 is looped about the spring shackle 14 and extends forward along the spring to the axle 10 and then toward the right along the axle as at 40 to deliver at the king pin 27, through a sub-distributing box (not shown) from which the associated tie rod bearing 41 is supplied.

The second charging compartment 42 drains into a conduit 43 extending longitudinally to the rear of the vehicle to a distributing box 44 mounted on the cross bar 45 having in this case, four compartments one connected by a conduit 46 to the front spring bolt 13 of the rear spring, a second connected by a conduit 47 extending rearward therefrom along the frame to the rear shackle 14, a third conduit 48 passing lubricant to the hand brake linkage 49 and a fourth conduit 50 to the foot brake linkage 51.

The fourth charging compartment 52 is similarly connected by a conduit 53 extending rearward therefrom to a distributing box 54 at the right of cross bar 45 from which the conduits 55, 56 and 57 are connected to lubricate the front spring bolt 13 of the rear spring, the rear spring shackle 14 and the brake mechanism 58 respectively. For lubrication of the brake mechanism on the rear wheels, oil is supplied from the third charging compartment 59 to a conduit 60 through an oil-tight swivel joint 61, adjacent the joint of the torque tube 63, conduit 62 extending lengthwise upon said torque tube and secured thereto as by staples 64 (Fig. 2) to supply a distributing box 65 preferably on top of the differential housing 66. The box 65 has compartments to drain three toward the left wheel and three toward the right, conduits 67 and 68 to the hand brake link joint (not shown), and conduit 69 to the foot brake link joint (not shown).

The charging station is preferably at an elevation higher than the sub-stations, which, in turn, are higher than the bearings, and all stations are suitably vented, so that the charge may pass freely by gravity from the charging station through the sub-stations to the bearings. The volume of each measuring compartment is preferably substantially equal to that of the substation compartments supplied therefrom, each of the latter compartments obtaining a charge sufficient for the bearing which it feeds.

In the operation of my system, it will be noted that definite measured charges are released at the charging station and sub-divided into definite measured subcharges at the sub-stations from which these charges drain to the bearings, each bearing thus receiving the complete charge therefor in a short interval after operation, thereby avoiding either deficiency or excessive overflow at any bearing. In an installation in which the lubrication is effected by constant or continuous slow rate of feed from a central station to the bearings, the latter would be likely to drip onto the road or garage floor, while the vehicle is idle and its chassis bearings not using lubricant, while on the other hand, if the charge from the central station is not measured, the bearings are likely to be either insufficiently or excessively lubricated.

The various alternative embodiments of constructions making up the installation diagrammatically shown in Fig. 1 and heretofore referred to will now be described in detail.

ALTERNATIVE MEASURING CHARGING STATIONS

*Charging station—Figs. 3 and 4.*—This embodiment comprises a receptacle preferably on the dashboard at a location convenient for hand filling. The vessel comprises a generally circular casting 70 having lugs 71 by which it is attached and formed with integral compartment walls 72 to sub-divide the vessel, in the present illustrative embodiment, into five chambers of different sizes to correspond to the different requirements of the various sub-stations to be supplied therefrom, each receptacle having an integral outlet nipple 73. To assure correct distribution of the oil when manually filled into the receptacle, I provide a distributing means preferably comprising an oil spreading plate 74 above the tops of the compartment walls 72 through which the lubricant supplied will drip substantially uniformly, so that each receptacle will be supplied with a quantity of oil substantially proportional to the area thereof. In the preferred embodiment, the plate 74 comprises a spreading pad of porous material, such as felt retained in position between two disks 75 of wire mesh screen clamped by a ring 76 against the base flange 77 of a cylindrical cup structure 78 having an outwardly extending flange 79 resting on the ledge 80 of the charging vessel and secured in position thereon as by screws 81. The charging box also has a removable cover 82 threaded thereon. The volume of the filling or distributing cup 74 is preferably equal to the combined volume of the filling compartments therebelow. In the operation of filling, the cover 82 is simply removed, lubricant is poured into the distributing cup 78 above the felt bottom, to substantially fill the same, whereupon the cover is again applied. The oil spreads substantially uniformly over the felt bottom 74, so that each compartment receives the desired or required charge of oil. It will, of course, be apparent that the felt distribution, performs the additional function of a filter to intercept any solid particles in the oil, so that only clean oil, unlikely to clog the outlets will pass to the bearings. From time to time, of course, the distributing filter cup may be removed, cleaned and replaced.

To assure reliable flow from the charging station, the latter is suitably vented through a notch 82' in the thread of the cover. If desired, I may employ the venting arrangement shown in the filter cup of Figs. 5 and 6 to be described below.

*Charging station—Figs. 5 and 6.*—Where the embodiment of Figs. 3 and 4 requires a separate manual filling operation, as from an oil can, the present embodiment includes a storing reservoir 83 from which the desired measured charges are delivered by a simple direct operation. In this embodiment, the reservoir 83 has cast integral with its bottom, a plurality, in the present form, five integral outlet nipples 84 within which fit measuring plungers 85 and to each of which a conduit 86 is connected as by a cap 87. Each plunger is provided with a beveled seat valve conformation 88 near its lower end urged against its seat 89 in the nipple by a corresponding coil spring 90 encircling the stem, pressing at one end against the reservoir bottom and at the other end against a collar 91 secured to the stem by a set screw 92. The larger or lower end 85 of each plunger is provided with a measuring cavity 93 normally communicating as at 94 when the plunger valve is seated, with the interior of the reservoir 83. It will be understood that to effect discharge from any one of the plungers, the same is operated by pressure upon its head 95 to depress the plunger, and unseat the valve 88, thereby bringing the upper end of the cavity 93 below the floor of reservoir 83 and sealing the measured charge therein from the main body of lubricant in the reservoir, whereupon the lubricant discharges by gravity into the nipple 84 and thence through the conduit 86. When the pressure is relieved from the plunger, the spring 90 returns the same to the position shown, in which valve 88 is seated to prevent further escape of oil to the line and is again in communication with reservoir 83 to be automatically refilled therefrom. The measuring cavities may of course, be of different volumes to accommodate the different sub-stations that may be employed.

In order to prevent the entry of any dirt or dust which might in time prevent the free operation of the plungers and clog the line, the plungers are preferably passed through glands 97 in the cover 98, each stem having a hood 99 pinned thereto, and telescoping over the corresponding gland when the plunger is operated. The cover 98 is preferably provided with a special filter cup appliance 100 having a filtering pad 101 in its bottom to prevent the entry of solid particles with the lubricant for filling the main reservoir. The construction of the filter cup may be substantially that shown in Fig. 17 in my copending application, Serial No. 580,668, filed Aug. 9, 1922.

The apparatus is preferably vented to assure ease of flow of oil from the filter cup 100 to the reservoir and from the latter to the line. For this purpose, I have illustratively shown a vent plug 412 in the cover of the filter cup, provided with oblique vent ducts 413 opening downward to guard against catching dust and, moreover, protected from contact with the fingers by the operating knob thereof. A filter vent plug fitting 414 is forced as at 415 into the filter cup 100 and is filled with filtering material 416 to intercept dirt which might otherwise pass into the reservoir with any small quantity of oil flowing outward through plug 414. To assure the re-entry of any air expelled from the line by the depression of the plunger 85, in order to assure reliable gravity flow of the charge when released, a pipe 96 is secured into the bottom of the reservoir, which communicates with the outlet nipple 84 at one end and with the air in the tank above the level of the lubricant at the other. Thus, the filter cup, the reservoir and the line are all vented and air leak is effectively prevented.

The various measuring plungers may, if desired, be provided with interlocking operating means, so that all of the plungers may be discharged by a single manual operation. For this purpose, a control yoke 102 is provided, pivoted as at 103 at the rear wall of the reservoir and provided with handles 104 near the side walls of the reservoir and with a cross-bar 105 resting on the telescoping hoods 99 of all of the plungers, so that depression of the yoke will depress all of the hoods, and, therefore, all of the plungers 85 concurrently. The control yoke 102 it will be seen clears the filling opening so that there is no difficulty in refilling the reservoir when required.

*Charging station—Figs. 7 and 8.*—Another desirable embodiment of charging or filling station comprises a substantially sealed measuring vessel charged preferably by a simple operation with lubricant from a separate tank or reservoir on the vehicle and draining to the bearings. Lubricant is to be passed from the tank into the charging station to completely fill the charging compartments thereof, means being provided for returning the overflow therefrom to the main tank, so that only the measured compartment charges will drain to the bearings. The charging station preferably comprises a casting including a plurality, in the present embodiment, five contiguous compartments or cups 106 arranged lengthwise of the vessel to be filled through a horizontal perforated pipe 107 extending thereabove and supplied from the reservoir. The pipe is supported in the sides 108 of the vessel, which is conformed as a gutter 109 therebelow into which the outflow from the pipe pours and from which it discharges to concurrently fill the receptacles 106. The overflow from all of the receptacles passes into a common outlet trough 110 extending preferably below the bottoms of the compartments 106 and for the length of the receptacle. The sealed cover 111 of the charging station has a venting pipe 112 reversely bent to prevent the dropping of dirt thereinto.

*Alternative filling apparatus for the charging station of Figs. 7 and 8.*—In the embodiment shown in Fig. 9 the charging station C is preferably mounted at a substantial elevation and to the rear of the instrument board 114 to be concealed in use. The main oil tank 115 in this embodiment, is shown below the floor board and is connected by a pipe 116 to the cylinder 117 of a foot pump normally charged from the tank 115 by gravity flow, past check valve 118. The foot pump is discharged past the spring seated check valve 119 through a pipe 120 communicating with filling pipe 107 in the elevated charging station. Each of the measuring receptacles is provided with a nipple 113 in its bottom from which the lubricant drains through conduits 121 to the various sub-stations and bearings. The overflow trough 110 is connected by a nipple 122 to a conduit 123 to return the excess oil to the main reservoir 115. The foot pump is shown as maintained in elevated or charged position by a coil spring 124 about the piston stem 125, the latter also provided with a hood 126 telescoping over the cylinder head 127 to prevent the entry of dirt. In the use of this system, the operator simply steps on the pump operating handle one or more times. In this operation he discharges the lubricant in the cylinder 117 past the check valve 119 to the line 120 into pipe 107 to fill the measuring compartments 106 of the charging station, any overflow returning through the trough 110 and conduit 123 to the main tank 115, the measured charges in the receptacles draining through nipples 113 and pipes 121 to the bearings. Check valve 118 prevents return of lubricant to the main reservoir on pump discharge, and check valve 119 prevents leakage between the pump cylinder and the conduit 120. The tank 115 is connected to atmosphere through vent 112.

*Fig. 10 and Fig. 11.*—In lieu of the special hand pump, I may elevate the lubricant to the charging stations by the use of the oil pump by which the engine bearings are lubricated. In Fig. 10 the engine oil pump 128 is supplied through pipe 129 dipping into the oil 130 in the engine sump 131. An external supply conduit 132 connects the pump to the filling pipe 107 of the charging station $C^3$ and the overflow pipe 133 communicates from the discharge trough 110 with the sump 131. Normally the connection through the conduit 132 is shut off by a valve V maintained closed as by a spring 134 with a pressure exceeding that evolved by the pump, so that the pump normally performs its engine lubricating function alone.

The valve may be of any type, operated in any desired manner. In the present embodiment, I have shown a desirable magnetically operated valve unit, indicated in detail in Fig. 11. This unit comprises a casing 135 for the solenoid 136 and has an intake nipple 137 connected with the oil pump and a delivery nipple 138 connected with the charging station $C^3$. The solenoid core or plunger 139 is formed integrally with the valve V provided with a yielding seating portion 141 and is pressed against the annular raised seat 140 by coil spring 134 encircling the core or valve stem 139. The lateral surface of valve head V constitutes a secondary seal for closing the delivery nipple 138. The solenoid is controlled preferably by a hand-operated switch (not shown) on the dash.

In operation, upon closing the switch, the solenoid is energized to elevate the plunger 139 to raise the valve V against the resistance of spring 134, opening the passage between the operating oil pump 128 and the charging station, so that a portion of the oil through pump 128 will pass through conduit 132 to fill the charging station $C^3$, the excess returning through pipe 133 to the sump 131. As the oil from the sump is likely to have solid impurities, which if intercepted at the valve V might interfere with its effectiveness, I prefer to provide a suitable filter indicated diagrammatically at 142 between the oil pump and the valve to intercept such particles.

*Figs. 12, 13 and 14.*—In lieu of the oil pump arrangements described, I may employ any of the alternative arrangements shown in Figs. 12, 13 and 14 all of which utilize energy derived directly from the engine by connection to some portion of the course or circuit of the combustible mixture through the engine, that is, by the application of suction from the intake, pressure from a cylinder under compression or pressure from the exhaust.

In Fig. 12 is shown an exhaust-operated system. In this embodiment, an auxiliary tank 143 is disposed at an elevation lower than the main tank T and is consequently normally maintained filled by oil entering by gravity past check valve 144 at the bottom of the auxiliary tank, the main tank being vented through the charging station at 112. The pressure of the exhaust is applied, when desired, through a conduit 145 extending through the closed top 146 of the auxiliary tank to elevate the contents thereof through conduit 147 for filling the compartments 106 of the charging station C. The conduit 145 is normally disconnected from the engine exhaust pipe by a two-way valve 148 having an elbow shaped passage 148' normally venting the auxiliary tank 146 as shown, a spring (not shown) normally maintaining the valve in the position shown in the drawings. The valve is provided with a plunger operating handle 149 preferably projecting from the dash, by which it is rotated through 90 degrees for connecting the conduit 145 with the conduit section 150 that extends into the engine exhaust pipe 151. Preferably there is a check valve 152 of any appropriate construction, preventing the relief of pressure in the tank 146 during the intervals between exhaust puffs, so that the pressure applied to the tank 146 from the exhaust will be continuous rather than intermittent. Any desirable form of filter purifier 153 may be placed in the circuit, preferably immediately adjacent the exhaust pipe 151 to intercept solid or liquid impurities, which might otherwise impair the efficacy of the lubrication, the latter draining back into the exhaust pipe.

With the engine running, the process of lubricating the bearings, consists simply in drawing the plunger 149 outward for a fraction of a minute, and then allowing it to return to restore the parts to the position shown. While the plunger is withdrawn part of the engine exhaust passes through conduit 150 and through valve 148 into conduit 145 to apply pressure upon the oil, which has previously entered the auxiliary tank 143, check valve 144 preventing return of oil into the main tank T so that the oil is raised through conduit 147 to enter pipe 107 in the charging station, to fill the compartments 106, check valve 152 maintaining the continuity of pressure. The overflow in the charging station returns through the pipe 154 to the main tank, the exhaust blast venting through pipe 145 and passage 148'. The measured quantities of lubricant in cups 106 drain through pipes 121 to the bearings in the manner previously described.

If desired, vent 112 may be closed air tight, so that the blast from the exhaust after filling the charging compartments would exert further pressure thereon to furnish propelling force for aiding in the discharge to the sub-stations or bearings. In the latter mode of operation, it is preferred to form the auxiliary tank of a volume equal substantially to that of the charging compartments only, and to dispense with the trough 110 and the overflow pipe 154, providing an appropriate vent at the cover of tank T to assure gravity flow therefrom to the auxiliary tank.

In Fig. 13 is shown an embodiment by which a charging station C³ of the type shown in Figs. 7 and 8 is filled by energy from the engine intake. In this embodiment, the engine intake 155 is connected by a conduit 156 through a valve 157 (when open) to a conduit 158 to apply suction at an auxiliary tank 159 for elevating lubricant from a main reservoir T through a connecting pipe 160, the oil in turn to drain from said auxiliary tank to the charging station C³. The pipe 160 is connected to the cover 173 of tank T by a fitting 174 provided with a check valve 175 below which extends a vertical pipe 176 terminating near the bottom of the tank.

In the preferred specific embodiment, the auxiliary tank is at an elevation higher than the charging station C³, so that the lubricant will drain therefrom to the charging station by gravity past a check valve 161, the overflow from the charging station returning through an overflow pipe 162 to the main tank T. The auxiliary tank is preferably provided with a reduced head 163 constituting a cylinder for a small piston 164 therein, the end of the stem 165 of which is a conical valve 166 normally maintained away from its seat 167 in the cover 168 by a coil spring 169 encircling the valve stem and urging the piston 164 against the stop 170. Normally, as shown in the drawings, the auxiliary tank 159 is vented through an opening 171 in the piston, valve seat 167, conduit 158, valve 157 and conduit 172. For operating the device, the valve 157 is turned preferably by operation of a handle (not shown) similar to that shown in Fig. 12 to connect the engine intake with the auxiliary tank 159. Air is thus sucked out of the latter, the check valve 161 being thereby urged against its seat and check valve 175 raised for passage of lubricant from the main tank T through pipe 176 and conduit 160 to fill the auxiliary tank 159. The main tank is vented either through an aperture in its cover or, as shown, through pipe 162, station C³ and tube 112. As the auxiliary tank becomes filled, the oil reaches the piston 164 and the latter is elevated thereby against the resistance of coil spring 169 to seat the valve 166 and thereby prevent the application of further suction to the tank. After the valve 157 is allowed to return to the original position shown in the drawings, to re-connect the auxiliary tank with atmosphere, air enters said auxiliary tank as the lubricant flows therefrom into the charging station C³ until the tank is completely discharged, the overflow from the cups of the charging station returning to the main tank through the overflow pipe 162. It is preferred to provide a dust collector 177 similar to that shown in Fig. 12 at the air inlet end of pipe 172 to prevent the entry of dust with the air refilling the tank 159, thus preventing clogging of the valves, valve seats and pipes. The main tank is provided with a filling cup 178 which serves to vent the tank and which is constructed similarly to the cup of the embodiment of Fig. 6 to intercept particles of dirt or dust poured in with the oil, the filter cup in this embodiment being shown with a screw plug closure 179 for the filling opening in the cover thereof.

If desired, suction may be produced by the means shown in the alternative arrangement of Fig. 14 for application to the apparatus shown in Fig. 13. In this embodiment, connections are employed for utilizing the aspirating effect of the exhaust pressure to apply suction. In the specific embodiment shown, a reduced Venturi section 180 is connected to deliver exhaust pressure from the engine exhaust pipe 151. A length of pipe 181 within the venturi and extending axially thereof in the direction of gas flow is connected through a check valve 182 to the conduit 156 of Fig. 13. The check valve, as shown in the drawings, comprises a valve casing having a seat 183, a valve 184 provided with a stem 185 fitting into a bore 186 in a corresponding closure plug 187 and seated by a coil spring 188. It will be apparent that a suction effect is produced by the aspirating action upon pipe 181 due to the reduced pressure of the exhaust gases passing through the venturi, thereby sucking the air out of the auxiliary tank 159 through the pipe 189 past check valve 184 and through pipe 158. The check valve, of course, functions in the intervals between exhaust puffs to seal the line 158 against entry of exhaust gas during the intervals between the aspirating puffs.

The sub-stations or distributing elements

A desirable location of these elements is shown diagrammatically in Fig. 1. A preferred construction is indicated in Figs. 15 and 16. The construction is in some respects similar to that of the hand-filled charging stations shown in Figs. 3 and 4, but, preferably, smaller since each substation is to receive its entire charge from some one compartment of the charging station. In the preferred construction shown in Figs. 15 and 16, the sub-station comprises a cast metal vessel 190 having lugs 191 for attachment as to the channel frame of the vehicle and is provided with partitions 192 fitting into corresponding grooves 193 in the opposite walls thereof, further cross partitions 194, 195 and 196 being provided to form in the specific embodiment shown six compartments, each of which is provided with a delivery or drain nipple 197. The sub-station is provided with a cover 198 and lubricant is admitted thereto through a horizontal perforated inlet pipe 199 extending longitudinally thereof and connected with the conduit from the charging station. The lubricant is distributed to the compartments in a manner generally similar to that shown in Figs. 3 and 4, the present construction comprising a pad 200 as of felt resting on a wire mesh screen support 201, which, in turn, rests upon the tops of the partition walls 192. Preferably, cross partitions of various thicknesses are provided, Fig. 15 showing a thin cross partition 194, one of intermediate thickness 195 and a third of greater thickness 196 and it is intended that the partitions be chosen as desired, to form individual compartments of required volume, so that a distributing box structure of uniform construction can be used on the various parts on the chassis and by appropriate choice of partitions, the compartments may be formed of the desired or required volumes. Where less than six compartments are required, one or more of the partitions may, of course, be omitted and the corresponding outlet nipples plugged.

The sub-station is vented preferably through a vent plug 412 similar to that shown in Fig. 6.

It will be understood that although it is preferred to provide sub-station box compartments of volume substantially no larger than required for the small charges to the bearings, a larger box may be used, the sub-division of the measured supply from the charging station being effected in proportions depending only on the relative not the absolute base areas of the sub-station box compartments.

It will be understood that any or all of the sub-stations may be of the type of the main charging stations shown in Figs. 7 and 8, the overflow trough and return duct being preferably omitted from such sub-stations, the measured charge from the charging station being that required to fill the compartments of the sub-station.

Alternative installations

In Fig. 17 I have shown an alternative arrangement of the sub-stations upon the chassis, including only four sub-stations. One station 334 is mounted upon the forward portion of the channel frame preferably at a point between the ends of the spring therebelow and a similar box 335 at the rear, similarly located between the ends of the rear spring, a second pair of sub-station boxes being provided on the other channel frame (not shown). The feed or charging station is shown at C on the dashboard and may be of any of the types heretofore described and is provided with four measuring compartments (not shown) to fill the collecting boxes, through conduits, only two of which are shown, conduit 336 supplying box 334 and conduit 337, box 335.

The lubricant flows from one of the compartments of sub-station 334, through conduit 338 to the shackle link of the associated spring and from another compartment thereof through a rigid conduit 339 running forward along the frame to the front bolt.

A third duct 340 serves to convey lubricant from a compartment of box 334 to the king pin and associated bearings (not shown). This third conduit may be of any of the constructions heretofore described or shown in my copending applications, above referred to. In the present embodiment, however, I have shown a special alternative construction comprising a length of flexible hose, rather than solid piping, for instance, hose of the type shown in Figs. 26 to 29 of my copending application, Serial No. 596,856 which extends forward along the frame, is looped about the front bolt as at 341 and thence extends lengthwise and preferably on top of the spring to the axle and thence to the bearings. The hose is sustained on the spring against lashing by means of special clips or hooks 342 which preferably are clamped in position upon the springs by the U-bolts 343 therefor. The flexible hose is preferably arranged to undulate back and forth as at 344 between successive securing hooks to compensate for the increase and decrease of the length of span between the axle and the spring eye, as the spring is deformed in operation.

The rear sub-station 335 is provided with preferably, a rigid metallic conduit 345 connecting one of the compartments thereof to the rear shackle link, and a pair of flexible hose conduits 346 and 347 similar to that shown in Figs. 18 and 19 and similarly arranged, provide lubricant for the brake linkage 348 and 349 respectively, it being understood that double hooks (not shown) are preferably provided for retaining the two lengths of flexible hose. As shown, the flexible hose extends preferably about the spring bolt, where there is a simple rotary movement of the spring end rather than at the shackle end, where the movement is composite, but, if desired, as shown for instance at 350 in Fig. 1, the flexible hose will lend itself to passing from the chassis to the axle around the shackle end of the spring.

In the embodiment of Fig. 1, as well as in the embodiment of Fig. 17 it may be desirable to lead the longitudinal conduit, such as at 337 horizontally below the floor board and obliquely or vertically upward as at 351 to sub-station 335. This may provide too long a course, particularly when piping of very small bore is used, to convey a small charge of lubricant by simple gravity feed. In a construction of this type, it may, accordingly, be desirable to maintain the horizontal portion of the solid pipe line carried on the chassis frame, filled with oil as at 352 to an elevation below that of the intake to the distributing box or sub-station 335, so that when a new charge of oil is admitted to said conduit from the charging station, the level of the oil at the delivery end of the pipe will rise to cause ejection of the charge past the bend 351 to fill the sub-station.

In Fig. 20 I have shown a simplified lubricating installation generally similar to that shown in Fig. 17 which dispenses, however, with the single central charging station and the longitudinal connecting piping therefrom, there being employed in lieu of the substations 353 and 354 of the general type shown in Figs. 3 and 4 but on a reduced scale, one or two of such stations supplying all the bearings near the front of the vehicle and one or two similarly supplying all of the bearings on the rear of the chassis, it being understood that said two or more stations are individually filled by hand. The construction is otherwise similar to that of Fig. 17 and need not be further described.

In Fig. 21 is shown another alternative arrangement, particularly suitable for the lubrication of the chassis bearings at the front of a vehicle of the Ford motor car type. This type of vehicle includes a transverse spring 355 extending parallel to the front axle and sustained by spring shackles 356 and 357 at the opposite ends thereof, in turn, pivotally mounted upon lugs 358 integral with the axle 359. For this embodiment, I prefer to mount a hand-filled charging vessel 360 of the general type shown in Figs. 3 and 4 directly upon the axle and in the embodiment shown, at an elevation somewhat higher than the king pins 361 and 362 preferably by the use of an appropriately shaped metal bracket 363 which may be clamped in position against the axle 359 by the head of the king pin. The different compartments of the filling or charging station are connected as shown in the drawings, a short conduit 364 to the contiguous king pin 361, a longer conduit 365 extending lengthwise of the axle to the other king pin 362, a conduit 366 supplying oil to the pivoted end of shackle 356 and another longer conduit 367 extending lengthwise of the axle to similarly supply the other spring shackle 357. As no relative movement occurs in operation between the ends of the various conduits, no flexibility is required, and they may be and preferably are all of solid metal pipe.

It will thus be seen that I have provided a particularly inexpensive and effective lubricating arrangement for the chassis bearings of a Ford vehicle, in which solid pipe conduits are used. The process of lubrication consists simply in removing the cover and filling the charging station 360 with lubricant and replacing the cover, whereupon the lubricant will pass by gravity flow through the various conduits to the bearings, which are all at a lower elevation. The horizontal portions of conduits 365 and 367 may, if desired, be normally retained full of oil in the manner set forth above in the description of Fig. 17 and a wick (not shown) may, if desired, be placed in the oblique part of conduit 365 adjacent king pin 362.

Sub-stations such as shown in Figs. 15 and 16 may be positioned at the knuckle structure to supply the king pin, the steering arm and tie rod bearings, for example, one compartment being utilized to supply the pivotal king pin bearings of the knuckle while other individual compartments are utilized to supply the tie rod and drag link bearings. Drip rods could be associated with or projected through the absorbent or spreading pad 200 for greater facility in the dripping of lubricant therefrom, which drip rods, if desired, could be utilized in all of the distributing boxes. If desired the sub-distributing boxes may be modified to take the form of a unitary fitting, with a single inlet and a plurality of outlets, for instance one outlet for the pivotal king pin bearing and the other two outlets for the drag link and tie rod bearings, the inlet portions of said outlets being made of such cross sectional area as to assure proper proportioning of the lubricant among the various knuckle bearings. Various other gravity flow distributing arrangements could also be utilized in and about the knuckle structure, which arrangements would automatically subdivide the charge of lubricant supplied to the knuckle structure by gravity among the various knuckle bearings.

These sub-stations or sub-distributing arrangements could also be supplied by pneumatic pressure, as well as by arrangements disclosed in my copending applications Serial No. 580,668, filed August 9, 1922, and Serial No. 596,856, filed August 25, 1922. Similar arrangements, as pointed out above for the knuckle bearings, could also be utilized for the lubrication of the various bearings associated with the spring hinges and shackles, or with the steering gear, in all cases suitable arrangements, including swivels and coiled or flexible tubing and spring runs being provided to accommodate relative movements between the chassis and the groups of bearings to be lubricated.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In a chassis lubricating installation, in combination, chassis bearings, lubricant dividing receptacles located at different localities on the vehicle, conduit means connecting the dividing receptacles with associated bearings to drain the lubricant therefrom, a centralized charging station for lubricant, conduits connecting said charging station with said dividing receptacles, said charging station having means stationary during operation to measure a definite supply for each dividing receptacle, said dividing receptacles being vented but otherwise substantially closed except for the entry of said conduits thereto and the exit therefrom to said bearings.

2. In a lubricating installation, for a chassis of the type comprising, road wheel axles, a frame and interposed springs, bearings on said frame, and bearings on said axles; the combination therewith of sub-stations on said frame, some toward the front and some toward the rear thereof, said sub-stations having measuring compartments, conduits connecting some of the measuring compartments to the bearings on the frame, flexible conduits connecting other measuring compartments with bearings on the axle, a charging receptacle having compartments and conduits from the respective compartments leading to the corresponding sub-stations and having substantially open draining connections with said sub-stations.

3. In a lubricating installation, for a chassis of the type comprising, road wheel axles, a chassis frame and interposed springs, bearings on said frame, and bearings on said axles; the combination therewith of sub-stations on said frame, some toward the front and some toward the rear thereof, said sub-stations having measuring compartments, substantially rigid conduits extending along the frame and connecting some of the measuring compartments to the bearings on the frame, flexible conduits connecting other measuring compartments with bearings on the axle, said conduits having substantially open draining connections with said bearings, a charging receptacle having compartments, and conduits from the respective compartments having substantially open draining connections with the corresponding sub-stations.

4. In a chassis lubricating installation, in combination, chassis bearings, a charging station including normally empty measuring compartments of definite volume, a separate conduit connecting each of said compartments with a corresponding group of said bearings, the delivery end thereof draining through a normally open connection, and means for initiating the charging of said compartments and the flow of the measured charges therefrom toward the bearings, said means also including a single inlet, the discharge from which is automatically proportioned in a predetermined fashion among said compartments.

5. In a chassis lubricating installation, in combination, chassis bearings, a multi-compartment charging station, separate conduits connected to said compartments and having normally open draining ends for supplying predetermined measured quantities of lubricant by gravity flow to corresponding groups of bearings, a reservoir, means for occasionally conveying lubricant from said reservoir to fill said compartments, and means for collecting the overflow from said compartments for future use, whereby only measured quantities in said compartments can travel to the bearings.

6. In a lubricating installation for a plurality of bearings, in combination, a volume measuring charging station, a lubricant reservoir, means for conveying lubricant from said reservoir to said station, means for collecting the overflow beyond the measured volume of charge, and gravity flow conduit means connected to convey said measured charge by drainage of said station and distributing it to the bearings.

7. In a lubricating installation for a plurality of bearings, in combination, a volume measuring charging station, a lubricant reservoir, means for conveying lubricant from said reservoir to said station, means for collecting the overflow beyond the measured volume of charge, a gravity flow conduit for returning said overflow to the reservoir, and gravity flow conduit means connected to convey said measured charge by drainage of said station and distributing it to the bearings.

8. In a lubricating installation for a plurality of bearings, in combination, a charging station having a plurality of measuring compartments, a lubricant tank, means for charging said station from said tank, means adjacent said compartments for collecting the overflow therefrom for future use, conduits connecting each of said measuring compartments to a corresponding group of bearings, said measuring compartments being at an elevation higher than said bearings for supplying the latter by gravity flow therefrom.

9. In a lubricating installation, in combination, a charging station comprising a vessel including a plurality of measuring compartments, and a gutter for collecting the overflow from said measuring compartments, a feed pipe in said charging station extending transversely over said measuring compartments to discharge thereinto, a lubricant reservoir, a conduit connecting said reservoir to said pipe, means for initiating the flow of lubricant from said reservoir through said pipe, and means for returning the overflow in said gutter to said reservoir.

10. The combination set forth in claim 9 in which the reservoir is at an elevation lower than the charging station, and in which the charging station is at an elevation higher than the bearings, whereby the lubricant will flow from the former to the latter by gravity.

11. In a chassis lubricating installation, the combination of a source of lubricant, chassis bearings, a multi-compartment volumetric measuring receptacle at an elevation higher than said source and than said bearings, means for raising lubricant from said source to charge said measuring receptacle, means to drain the excess from said measuring receptacle to said source, and means to drain the measured charges from the compartments of the receptacle to the respective bearings.

12. In a chassis lubricating installation, in combination, an engine, a source of lubricant, chassis bearings, a multi-compartment volumetric measuring receptacle, at an elevation higher than said source, and than said bearings, means operated by power derived from said engine for occasionally transporting lubricant from said source to said measuring receptacle, means to drain the excess from said measuring receptacle to said source and means to drain the measured charges from the compartments of the receptacle to the respective bearings.

13. In a chassis lubricating installation, in combination, bearings, an engine, an oil pump therefor, a multi-compartment measuring charging station at an elevation higher than said bearings, means for connecting said oil pump to convey lubricant to said measuring station, and means to return the excess from said measuring station.

14. In a chassis lubricating installation, in combination, chassis bearings, an engine having a crank-case sump for oil, an oil pump for said engine, a multi-compartment measuring station at an elevation higher than said sump and than said bearings, a valve-controlled conduit connecting said pump to supply oil from said sump to said station, and filter means interposed between said sump and the valve control means to maintain the valve seat clean.

15. In a centralized lubricating installation for vehicles, of the type including, an engine having a conduit for the mixture which conduit comprises an intake manifold, engine cylinders and an exhaust, the combination therewith of a multi-compartment measuring charging station, normally empty conduits from said station to the bearings of the vehicle, and means connecting a portion of said mixture conduit with respect to said measuring station to effect an operation precedent to and controlling drain of measured quantities of oil from said compartments to the bearings.

16. In a centralized chassis lubricating installation, in combination, bearings, a source of lubricant, an engine having a conduit for the mixture including an intake manifold, engine cylinders and an exhaust manifold, a charging station at an elevation higher than said bearings for supplying the latter by drainage therefrom, and means connecting said source to a portion of said mixture conduit to apply energy to said source for occasionally filling said charging station with lubricant.

17. In a chassis lubricating installation for a motor vehicle, in combination, an engine having a conduit for the mixture including an intake manifold, engine cylinders and an exhaust, a lubricant reservoir, a charging station at an elevation higher than said reservoir and said bearings, and means connecting a portion of said mixture conduit with respect to said reservoir to elevate lubricant from the latter to said charging station for occasionally filling the latter.

18. The combination set forth in claim 17 in which the charging station has a plurality of measuring compartments each connected to associated bearings and in which a conduit is provided for returning the overflow from said measuring compartments to said reservoir.

19. In a chassis lubricating installation for a motor vehicle, in combination, an engine having a conduit for the mixture including an intake manifold, engine cylinders and an exhaust, a main lubricant reservoir, a charging station, a container for collecting lubricant from said main reservoir preparatory to delivery therefrom to said charging station, conduit means connecting a portion of said mixture conduit with said container to effect flow of lubricant through part of the path between said main reservoir and said charging station, the flow through the remaining path being by drainage.

20. In a lubricating installation for motor vehicles, in combination, a main lubricant reservoir, a measuring compartment charging station at an elevation higher than said reservoir, a container at an elevation lower than said main reservoir, a conduit connecting said reservoir to said container to maintain the latter normally filled, a conduit connecting said container to said charging station, conduit means connecting the exhaust of said engine to said container, means for connecting and disconnecting the exhaust blast with respect to said container, whereby upon connection of said means, the exhaust will apply pressure to said container to elevate the contents thereof to said measuring charging station for delivery to the bearings, and a conduit connecting said charging station to said main tank for returning the overflow thereto.

21. The combination set forth in claim 20 in which the connection and disconnection of the exhaust is effected through a manually operated valve and in which filter means is interposed between said valve and said exhaust.

22. In a centralized lubricating installation for motor vehicles, in combination, a main lubricant reservoir, a multi-compartment measuring charging station, a container at an elevation higher than said charging station, and said reservoir, a conduit connecting said reservoir to said container, conduit means connecting said engine to said container, means for applying to said conduit means, suction engendered by the operation of said engine for raising lubricant from said reservoir to said container, and means for automatically interrupting the suction when the container is filled to a predetermined extent, whereby the lubricant will thereupon flow from said container to said charging station.

23. In a centralized lubricating installation, in combination, an engine, a reservoir, a container at a higher elevation than said reservoir to be supplied with lubricant therefrom, means to apply suction from said engine to exhaust said container of air for sucking lubricant thereinto, and a filter interposed in the path of air refilling said container as the lubricant is discharged therefrom.

24. A measuring charging station for supplying a plurality of bearings, said station comprising a unitary vessel having a plurality of compartments therein provided with outlets for connection of conduits through which the bearings are supplied, a delivery pipe through said vessel at an elevation higher than said compartments for discharging thereinto, and a collecting trough independent of the course of flow from the delivery pipe to the compartments in a unitary construction with said compartments for intercepting the overflow therefrom.

25. As an element in a lubricating installation, an oil distributing vessel having a plurality of compartments at the bottom thereof, each having a nipple draining lubricant therefrom by gravity flow, and an oil absorbing pad in said vessel above said compartments, whereby lubricant poured upon said pad will be distributed in said compartments in proportion to the areas thereof.

26. A measuring charging station comprising a vessel having a plurality of compartments therein, a filling cup over said compartments and substantially equal in capacity to that of said compartments combined, said filling cup having an absorbing pad bottom and a displaceable cover for said vessel, each of said compartments having a nipple draining lubricant by gravity flow for delivery therefrom to a pipe line, whereby upon filling of the cup, oil will pass through said absorbing pad to deliver oil to said compartments substantially in proportion to the areas thereof.

27. As an element in a lubricating installation, in combination, a distributing box comprising a vessel having a plurality of compartments therein provided with drain openings, an oil absorbing pad within said vessel above said compartments and extending substantially over the entire plane area thereof, a sealing cover for said compartment, and a filling element extending into said compartment above said absorbing pad.

28. In a lubricating installation, in combination, bearings, an oil reservoir, a plurality of measuring charging compartments, conduits open throughout the length thereof to drain from said compartments to said bearings, and means for controlling the filling and consequent discharge of said compartments, said means arranged to be manually operated and to be automatically returned to normal position, said means also including a single inlet, the discharge from which is automatically proportioned in a predetermined fashion among said compartments.

29. A chassis lubricating installation including a branched delivery piping system leading to various bearings, said delivery system having an effective lubricant containing capacity sufficient to meet the bearing requirements, means whereby energy is applied from the heated exhaust to propel lubricant to the bearings and the total charge to all of the bearings is measured and the individual charges to the individual bearings are proportioned, a main lubricant supply for replenishing said system, means responding to said energy transfer from the heated exhaust to shut off communication from said main supply to said system for the duration of said energy transfer and means to determine the total charge supplied to the bearings and to proportion the propelled lubricant among said bearings associated with each of said branches, the lubricant being propelled from and to said means by said energy applying means.

30. A chassis lubricating installation including a branched delivery piping system leading to various bearings, said delivery system having an effective lubricant containing capacity sufficient to meet the bearing requirements, means whereby energy is applied from the heated exhaust to propel during vehicle operation, lubricant sufficient to meet the requirements of the bearings and the total charge to all of the bearings is measured and the individual charges to the individual bearings are proportioned, a main lubricant supply for replenishing said system, means responding to said energy transfer from the heated exhaust to shut off communication from said supply to said system for the duration of said energy transfer, the energy transfer means being provided with means to prevent the entry into the lubricant of any solid particles from the exhaust and means to determine the total charge supplied to the bearings and to proportion the propelled lubricant among said bearings associated with each of said branches, the lubricant being propelled from and to said means by said energy applying means.

31. A chassis lubricating system for a motor vehicle including a branched delivery piping system, a service reservoir of effective volume for the lubricant requirements, means whereby energy is applied from the heated exhaust to propel during vehicle operation, lubricant sufficient to meet the requirements of the bearings and the total charge to all of the bearings is measured and the individual charges to the individual bearings are proportioned, a main lubricant container for replenishing said service reservoir, means responding to said energy transfer from the heated exhaust to shut off communication from said supply to said service reservoir for the duration of said energy transfer and means to determine the total charge supplied to the bearings and to proportion the propelled lubricant among said bearings associated with each of said branches, the lubricant being propelled from and to said means by said energy applying means.

32. A chassis lubricating system for a motor vehicle including a branched delivery piping system, a service reservoir of effective volume for the lubricant requirements, means whereby energy is applied from the heated exhaust to propel lubricant to the bearings and the total charge to all of the bearings is measured and the individual charges to the individual bearings are proportioned, a main lubricant container for replenishing said service reservoir, means responding to said energy transfer from the heated exhaust to shut off communication from said supply to said service reservoir for the duration of said energy transfer, the energy transfer means being constructed and arranged to prevent the entry into the lubricant of any solid particles from the exhaust and means to determine the total charge supplied to the bearings and to proportion the propelled lubricant among said bearings associated with each of said branches, the lubricant being propelled from and to said means by said energy applying means.

33. A chassis lubricating installation including a lubricant reservoir, a service container in communication therewith and a branched distributing piping system supplied therefrom, means whereby from time to time energy is applied from the heated exhaust to propel from said service reservoir lubricant sufficient to meet the requirements of the bearings and the total charge to all of the bearings is measured and the individual charges to the individual bearings are proportioned, a check valve preventing communication to or from the reservoir during pressure application and permitting automatic refill of the service container from the reservoir after the application to said service container of energy from the engine exhaust has been discontinued and means to determine the total charge supplied to the bearings and to proportion the propelled lubricant among said bearings associated with each of said branches, the lubricant being propelled from and to said means by said energy applying means.

34. A central chassis lubricating installation for an automotive vehicle provided with a hood enclosed structure convenient for manual access and with a group of closely associated chassis bearings substantially removed from said hood enclosed structure, comprising a branched distributing piping system, a central lubricant supply installation positioned within said hood, provided with a manual filling connection and including a segregating arrangement for measuring a charge into said piping system sufficient for the requirements of said chassis bearings, and an arrangement positioned substantially removed from said central lubricant supply, and adjacent and above said closely associated bearings, for receiving the lubricant for said associated bearings and dividing it therebetween by gravity flow, said arrangement including proportioning means having a plurality of passages leading to said associated bearings.

35. In a lubricating system for an automotive vehicle chassis carrying an engine, means for utilizing the engine oil for lubricating the chassis, comprising a common supply station, a pump for moving the oil from the engine sump to said supply station, means for returning to the engine crank case the surplus oil moved to said supply station, local supply stations located closely adjacent to the parts on the chassis to be lubricated, pipes directly connecting the local stations with said common station and means within the local stations for feeding the oil therein to the parts to be lubricated.

36. In a lubricating system for an automotive vehicle chassis carrying an engine, means for utilizing the engine oil for lubricating the chassis, comprising a pump, local lubricant distributing stations located closely adjacent to the parts on the chassis to be lubricated, a distributing system connecting the local stations with the pump and with the engine oil sump, said pump being adapted to transfer the oil from said sump to said stations and means positioned between said pump and said system for controlling and filtering the lubricant flow therebetween.

37. In a lubricating system for an automotive vehicle having an engine, a plurality of local oil distributing stations located closely adjacent to the various parts of the vehicle to be lubricated, a common main station for holding oil for all of said plurality of local stations, unobstructed pipes connected between the common station and the local stations and cooperating with said local stations so the same are refilled as the oil is used therefrom, a pump having a suction line to the engine oil sump and a discharge line from said pump to said common station, an over-flow pipe between the common station and the engine oil sump and absorbent means in the local stations to control the feed of oil to the various parts to be lubricated.

38. In a centralized lubricating installation for motor vehicles, in combination, a main lubricant reservoir, a multi-compartment measuring charging station, a container at an elevation higher than said charging station, and said reservoir, a conduit connecting said engine to said container, means for applying to said conduit means suction engendered by the operation of said engine for raising lubricant from said reservoir to said container, and means for automatically interrupting the section when the container is filled to a predetermined extent, whereby the lubricant will thereupon flow from said container to said charging station, the charging station being at an elevation higher than the reservoir and an overflow pipe connecting said elements to return excess lubricant to the latter.

39. In a centralized lubricating installation for motor vehicles, in combination, a main lubricant reservoir, a multi-compartment measuring charging station, a container at an elevation higher than said charging station and said reservoir, a conduit connecting said engine to said container, means for applying to said conduit means suction engendered by the operation of said engine for raising lubricant from said reservoir to said container, and means for automatically interrupting the suction when the container is filled to a predetermined extent, whereby the lubricant will thereupon flow from said container to said charging station, the container having a valve controlled by lubricant therein to render ineffective the suction applying conduit when said container is filled to a predetermined extent.

40. A central chassis lubricating installation for an automotive vehicle provided with a hood enclosed structure convenient for manual access and with a group of closely associated chassis bearings substantially removed from said hood enclosed structure, comprising a branched distributing piping system, a central lubricant supply installation positioned within said hood, provided with a manual filling connection and including a segregating arrangement for measuring a charge into said piping system sufficient for the requirements of said chassis bearings, and an arrangement positioned substantially removed from said central lubricant supply, and adjacent and above said closely associated bearings for receiving the lubricant for said associated bearings and dividing it therebetween by gravity flow, said arrangement including proportioning means having a plurality of passages leading to said associated bearings, the distribution from the central lubricant supply installation toward the dividing receiver being initiated and controlled by energy derived incidental to actuation of said automotive vehicle.

41. A central chassis lubricating installation for an automotive vehicle provided with a hood enclosed structure convenient for manual access and with a group of closely associated chassis bearings substantially removed from said hood enclosed structure, comprising a branched distributing piping system, a central lubricant supply installation positioned within said hood, provided with a manual filling connection and including a segregating arrangement for measuring a charge into said piping system sufficient for the requirements of said chassis bearings, and an arrangement positioned substantially removed from said central lubricant supply, and adjacent and above said closely associated bearings, for receiving the lubricant for said associated bearings and dividing it therebetween by gravity flow, said arrangement including proportioning means having a plurality of passages leading to said associated bearings, the automotive vehicle being provided with an engine having an engine oil pump and the central lubricant supply installation including said engine oil pump.

42. A central chassis lubricating installation for an automotive vehicle provided with a hood enclosed structure convenient for manual access and with a group of closely associated chassis bearings substantially removed from said hood enclosed structure, comprising a branched distributing piping system, a central lubricant supply installation positioned within said hood, provided with a manual filling connection and including a segregating arrangement for measuring a charge into said piping system sufficient for the requirements of said chassis bearings, and an arrangement positioned substantially removed from said central lubricant supply, and adjacent and above said closely associated bearings, for receiving the lubricant for said associated bearings and dividing it therebetween by gravity flow, said arrangement including proportioning means having a plurality of passages leading to said associated bearings, the automotive vehicle being provided with a mixture conduit including an intake manifold, engine cylinders and an exhaust and the central lubricant supply installation including means energized from said mixture conduit.

43. A central chassis lubricating installation for an automotive vehicle provided with a hood enclosed structure convenient for manual access and with a group of closely associated chassis bearings substantially removed from said hood enclosed structure, comprising a branched distributing piping system, a central lubricant supply installation positioned within said hood, provided with a manual filling connection and including a segregating arrangement for measuring a charge into said piping system sufficient for the requirements of said chassis bearings, and an arrangement positioned substantially removed from said central lubricant supply, and adjacent and above said closely associated bearings, for receiving the lubricant for said associated bearings and dividing it therebetween by gravity flow, said arrangement including proportioning means having a plurality of passages leading to said associated bearings, the automotive vehicle being provided with a mixture conduit including an intake manifold, engine cylinders and an exhaust and the central lubricant supply installation including means energized from said intake manifold.

44. A central chassis lubricating installation for an automotive vehicle provided with a hood enclosed structure convenient for manual access and with a group of closely associated chassis bearings substantially removed from said hood enclosed structure, comprising a branched distributing piping system, a central lubricant supply installation positioned within said hood, provided with a manual filling connection and including a segregating arrangement for measuring a charge into said piping system sufficient for the requirements of said chassis bearings, and an arrangement positioned substantially removed from said central lubricant supply, and adjacent and above said closely associated bearings, for receiving the lubricant for said associated bearings and dividing it therebetween by gravity flow, said arrangement including proportioning means having a plurality of passages leading to said associated bearings, the automotive vehicle being provided with a mixture conduit including an intake manifold, engine cylinders and an exhaust and the central lubricant supply installation including means energized from said exhaust.

45. In a centralized lubricating installation for the bearings of motor vehicles having suction creating engines, in combination, a main lubricant reservoir and a main measuring station, subsidiary measuring stations connected to said bearings, a conduit system connecting said reservoir and main station to said subsidiary stations, conduit means connecting said engine to said main station, means for applying suction engendered by the operation of said engine for causing dispensation of lubricant from said reservoir to said stations and to said bearings, and means for controlling the suction so that in turn the main station, the subsidiary stations and the bearings will receive their proper supply.

46. A central chassis lubricating installation for an automotive vehicle provided with groups of associated chassis bearings, said installation comprising a branched distributing piping system, with branching conduits leading to the different groups of chassis bearings, one for each group, a central main lubricant supply installation provided with a segregating arrangement to separate and simultaneously supply charges of lubricant to each of said branching conduits and to each of said groups of bearings, said charges being sufficient for the requirements of said groups of chassis bearings, and proportioning means positioned substantially removed from said central lubricant supply, and adjacent to said groups of bearings for receiving the lubricant charge for said bearings and dividing it therebetween, said proportioning means having passages leading to said associated bearings and feeding lubricant thereto by gravity flow passages.

47. A central chassis lubricating installation for an automotive vehicle provided with an engine structure enclosed by a hood and with groups of associated chassis bearings removed from said hood enclosed structure, said installation comprising a branched distributing piping system, with branching conduits leading to the different groups of chassis bearings, one for each group, a central lubricant supply installation positioned within said hood provided with a segregating arrangement to separate and simultaneously supply charges of lubricant to each of said branched conduits and to each of said groups of bearings, said charges being sufficient for the requirements of said groups of chassis bearings, and proportioning means positioned substantially removed from said central lubricant supply, and adjacent to said groups of bearings for receiving the lubricant charge for said bearings and dividing it therebetween, said proportioning means having passages leading to said associated bearings and feeding lubricant thereto by gravity flow passages, distribution from the central lubricant supply installation toward the segregating arrangement and proportioning means being initiated and controlled by energy derived incidental to actuation of said automotive vehicle.

48. A central chassis lubricating installation for an automotive vehicle provided with a hood enclosed structure conveniently arranged for manual access and with groups of associated chassis bearings removed from said hood enclosed structure, said installation comprising a branched distributing piping system, with branched piping conduits leading to the different groups of chassis bearings, one for each group, a central lubricant supply installation positioned within said hood provided with a segregating arrangement to separate and simultaneously supply charges of lubricant to each of said branched conduit systems and to each of said groups of bearings, said charges being sufficient for the requirements of said groups of chassis bearings, and proportioning means positioned substantially removed from said central lubricant supply, and adjacent to said groups of bearings for receiving the lubricant charge for said bearings and dividing it therebetween, said proportioning means having passages leading to said associated bearings and feeding lubricant thereto by gravity, the automotive vehicle being provided with an engine having an engine oil pump and the central lubricant supply installation including said engine oil pump.

49. A central chassis lubricating installation for an automotive vehicle provided with a hood enclosed structure conveniently arranged for manual access and with groups of associated chassis bearings removed from said hood enclosed structure, said installation comprising a branched distributing piping system, with branched piping conduits leading to the different groups of chassis bearings, one for each group, a central lubricant supply installation positioned within said hood provided with a segregating arrangement to separate and simultaneously supply charges of lubricant to each of said branched conduit systems and to each of said groups of bearings, said charges being sufficient for the requirements of said groups of chassis bearings, and proportioning means positioned substantially removed from said central lubricant supply, and adjacent to said groups of bearings for receiving the lubricant charge for said bearings and dividing it therebetween, said proportioning means having passages leading to said associated bearings and feeding lubricant thereto by gravity, the automotive vehicle being provided with a mixture conduit including an intake manifold, engine cylinders and an exhaust and the central lubricant supply installation including means energized from said mixture conduit.

50. A central chassis lubricating installation for an automotive vehicle provided with a hood enclosed structure conveniently arranged for manual access and with groups of associated chassis bearings removed from said hood enclosed structure, said installation comprising a branched distributing piping system, with branched piping conduits leading to the different groups of chassis bearings, one for each group, a central lubricant supply installation positioned within said hood provided with a segregating arrangement to separate and simultaneously supply charges of lubricant to each of said branched conduit systems and to each of said groups of bearings, said charges being sufficient for the requirements of said groups of chassis bearings, and proportioning means positioned substantially removed from said central lubricant supply, and adjacent to said groups of bearings for receiving the lubricant charge for said bearings and dividing it therebetween, said proportioning means having passages leading to said associated bearings and feeding lubricant thereto by gravity, the automotive vehicle being provided with a mixture conduit including an intake manifold, engine cylinders and an exhaust and the central lubricant supply installation including means energized from said intake manifold.

51. A central chassis lubricating installation for an automotive vehicle provided with a hood enclosed structure conveniently arranged for manual access and with groups of associated chassis bearings removed from said hood enclosed structure, said installation comprising a branched distributing piping system, with branched piping conduits leading to the different groups of chassis bearings, one for each group, a central lubricant supply installation positioned within said hood provided with a segregating arrangement to separate and simultaneously supply charges of lubricant to each of said branched conduit systems and to each of said groups of bearings, said charges being sufficient for the requirements of said groups of chassis bearings, and proportioning means positioned substantially removed from said central lubricant supply, and adjacent to said groups of bearings for receiving the lubricant charge for said bearings and dividing it therebetween, said proportioning means having passages leading to said associated bearings and feeding lubricant thereto by gravity, the automotive vehicle being provided with a mixture conduit including an intake manifold, engine cylinders and an exhaust and the central lubricant supply installation including means energized from said exhaust.

52. A central chassis lubricating installation for an automotive vehicle provided with groups of relatively closely associated chassis bearings to be lubricated, a plurality of central supply stations, one positioned adjacent to each of said groups, individual conduits leading from said supply stations to each of said bearings of said group, each of said supply stations being provided with means to control the amount of lubricant supplied to each of said individual conduits and to each of said bearings, and a central source of lubricant pressure supply adapted to be connected to each of said supply stations to supply lubricant thereto to be divided among the individual bearings of said groups of said supply stations.

53. A central chassis lubricating installation for an automotive vehicle provided with groups of relatively closely associated chassis bearings to be lubricated, a plurality of central supply stations, one positioned adjacent to each of said groups, individual conduits leading from said supply stations to each of said bearings, of said group, each of said supply stations being provided with means to control the amount of lubricant supplied to each of said individual conduits and to each of said bearings and a central source of lubricant pressure supply adapted to be connected to each of said supply stations to supply lubricant thereto to be divided among the individual bearings of said groups of said supply stations, said groups of bearings being respectively the bearings upon the front axle, the bearings upon the rear axle, the bearings upon the front of the chassis frame, and the bearings upon the rear of the chassis frame.

JOSEPH BIJUR.